Patented May 24, 1932

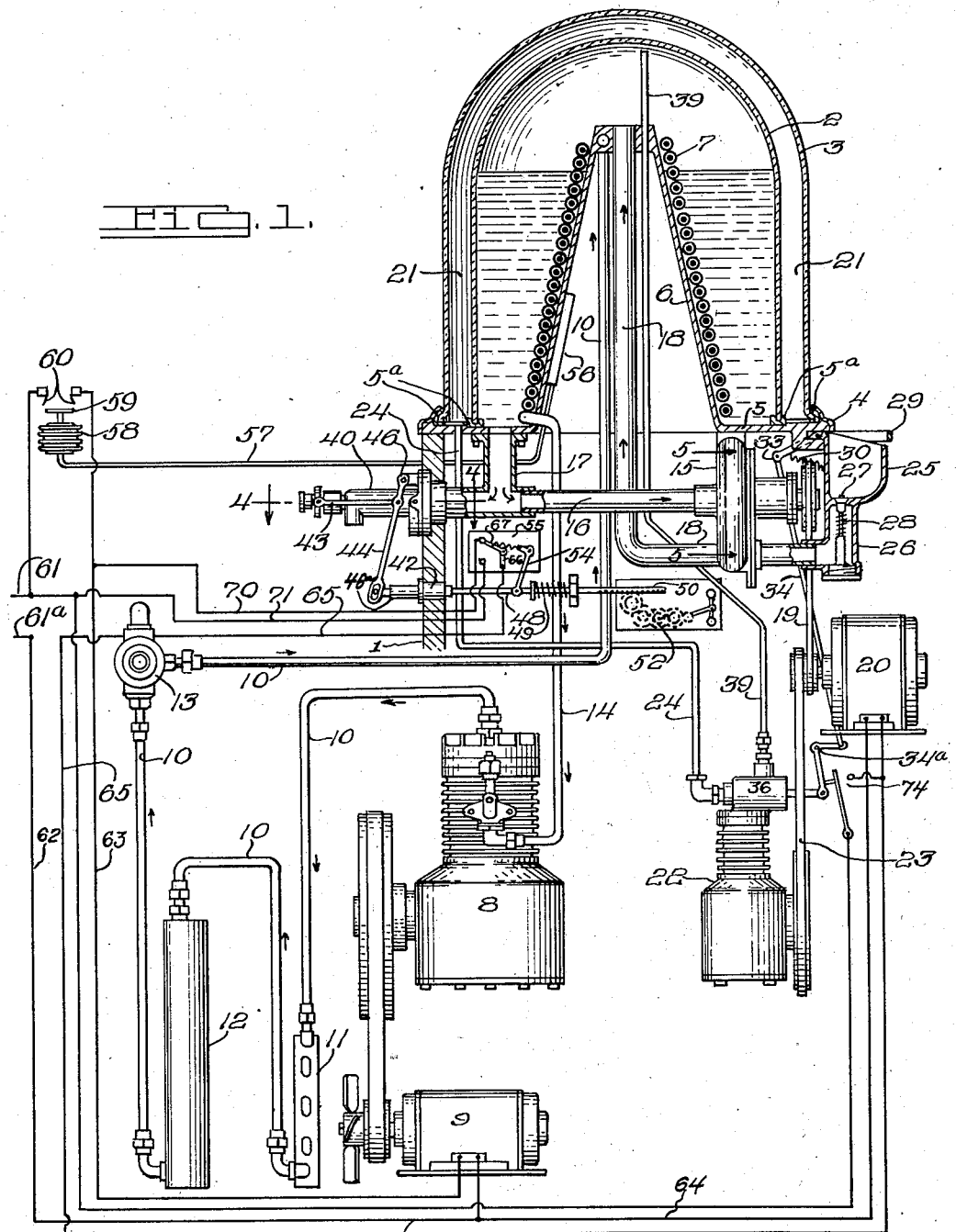

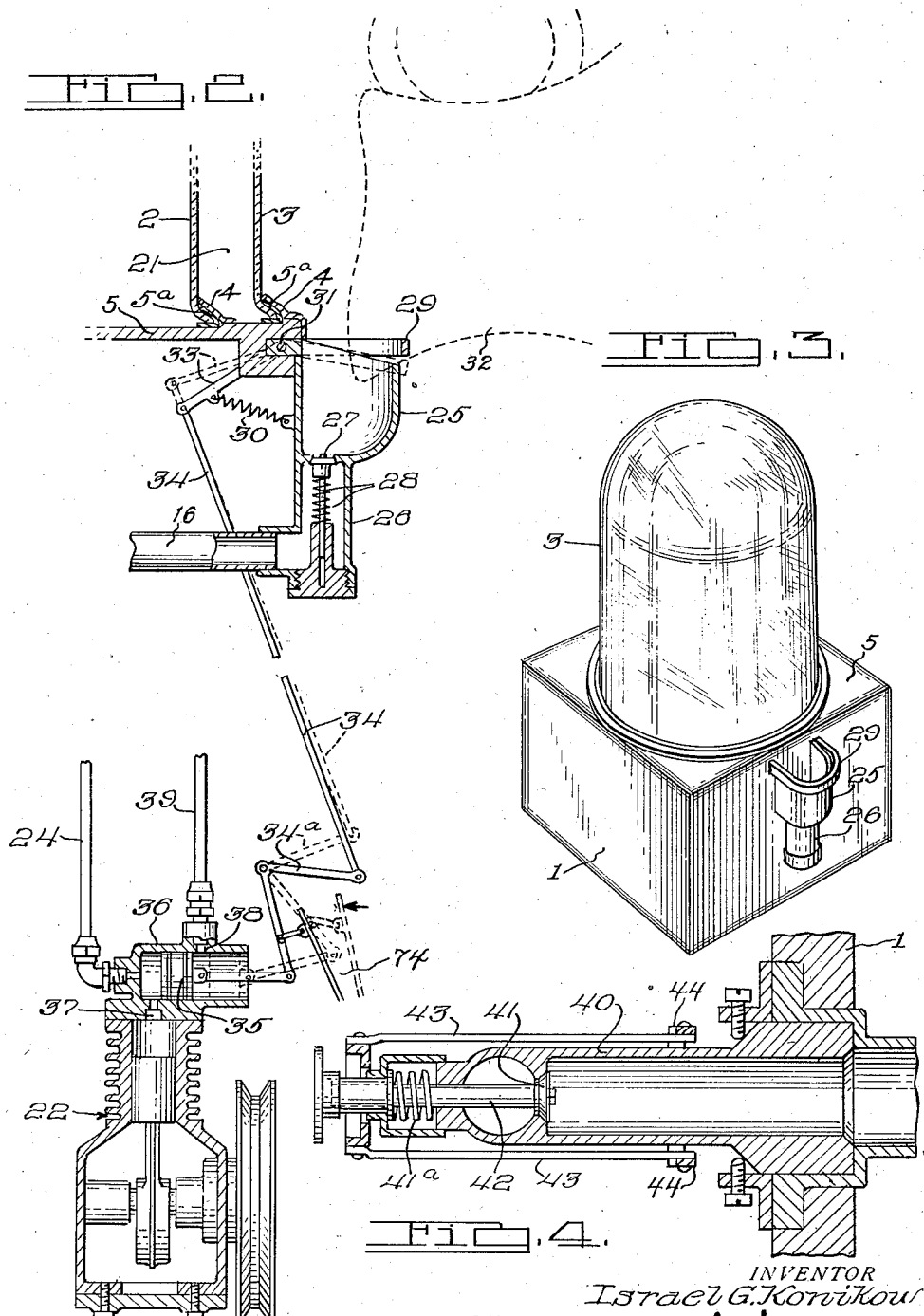

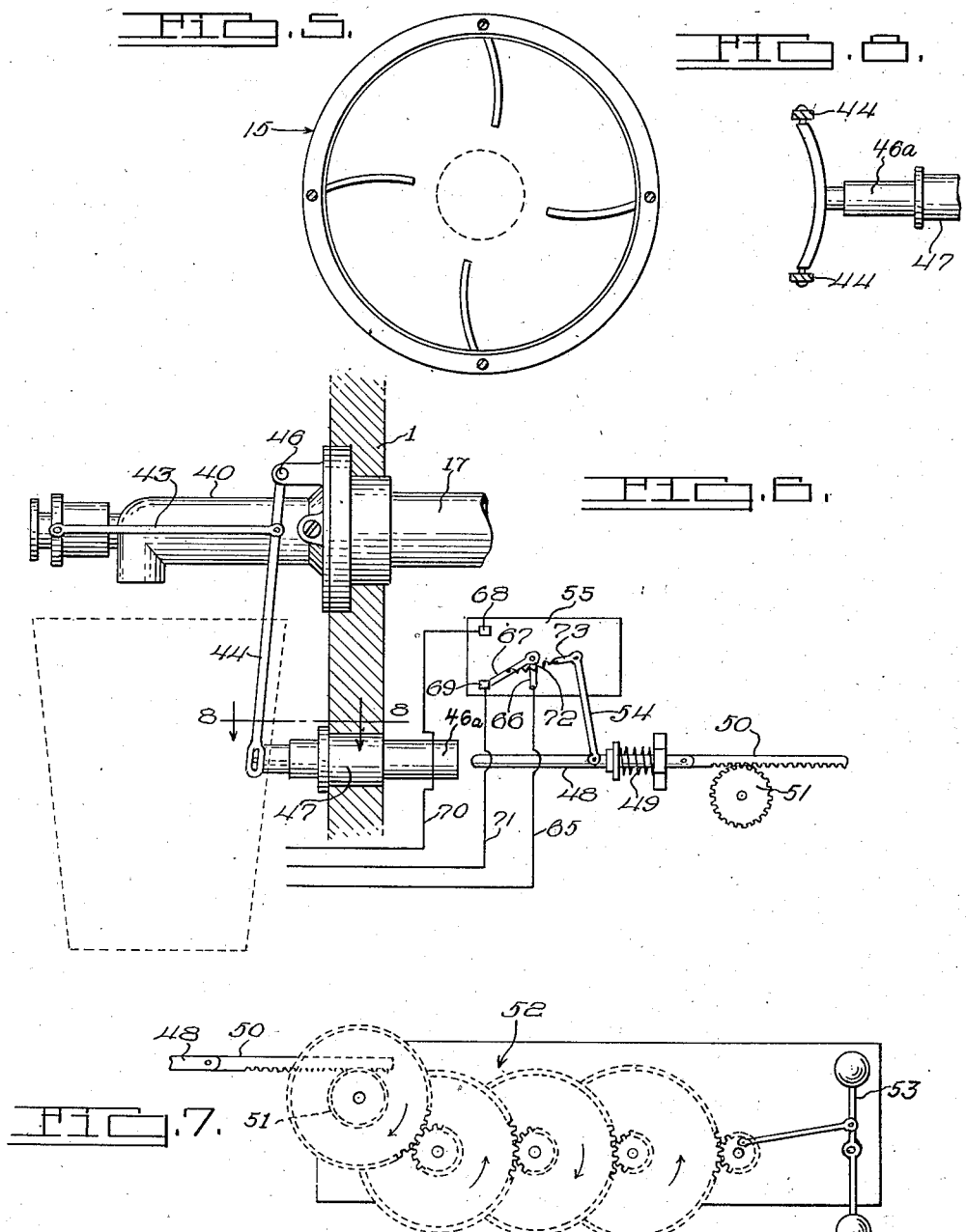

1,859,566

UNITED STATES PATENT OFFICE

ISRAEL GARSON KONIKOW, OF DETROIT, MICHIGAN, ASSIGNOR TO MARY BACHER, OF DETROIT, MICHIGAN

BEVERAGE DISPENSING APPARATUS

Application filed February 14, 1930. Serial No. 428,432.

This invention relates to beverage dispensing apparatus and particularly to apparatus for both refrigerating and dispensing a beverage.

An object of the invention is to equip a beverage dispenser with a double-walled reservoir for a beverage, to effect approximate evacuation of the space between its walls to effectively exclude heat, and to provide for an intermittent renewal of evacuation.

Another object is to form such a reservoir of inner and outer inverted transparent bowls, and to continuously withdraw a beverage from the lower portion of the inner bowl and return it as a miniature fountain in the top portion of said bowl, to form an attractive display.

A further object is to provide for evacuating the inner bowl preliminary to replenishing the supply of beverage, whereby atmospheric pressure affects a rise of the replenishing supply of beverage in the bowl.

Still another object is to adapt an air pump to intermittently evacuate the space between the two bowls and to further utilize said pump, when desired, to evacuate the inner bowl.

A still further object is to mount a movable control element marginally of an opening for delivery of a replenishing beverage to said reservoir, and to render a vacuum pump effective to withdraw air from said reservoir, responsive to pressure applied to said control element by the spout of a vessel from which the replenishing beverage is delivered.

An additional object is to provide electrically energized means for effecting a circulation of a beverage for display or other purposes, to close the circuit of said means upon opening of the valve by which the beverage is dispensed, and to maintain such circuit closed for a predetermined time following closing of said valve.

An additional object is to associate with a beverage dispenser separate means for circulating a refrigerant to cool the beverage and for circulating the beverage for display purposes, and to automatically establish and maintain both such circulations during such time as the temperature of the beverage exceeds a predetermined limits.

These and various other objects the invention attains by the construction hereinafter described and illustrated in the accompanying drawings, wherein:

Fig. 1 is a diagrammatic, elevational view partially in section, showing the complete apparatus, including electrical connections.

Fig. 2 is another view repeating a portion of Fig. 1 but showing another position of the parts.

Fig. 3 is a perspective view of the cabinet which receives said apparatus.

Fig. 4 is a horizontal, sectional view taken upon the line 4—4 of Fig. 1, showing certain details of the faucet.

Fig. 5 is a vertical, sectional detail of a centrifugal pump, the section being taken upon the line 5—5 of Fig. 1.

Fig. 6 is a view duplicating a portion of Fig. 1 illustrative of mechanism controlling a switch by a faucet, and showing another position of the parts.

Fig. 7 is an elevational view of a clockwork mechanism employed in the construction.

Fig. 8 is a cross-sectional detail on line 8—8 of Fig. 6 of a mechanism operating the faucet and other parts.

In these views, the reference character 1 designates a cabinet which is adapted to rest upon a floor, counter, or other support, and is surmounted by a reservoir comprising spaced, inverted inner and outer bowls 2 and 3. The open lower ends of said bowls are outwardly flanged for engagement by clamping rings 4, securing the reservoir upon a metallic base 5, constituting a top for the cabinet 1, suitable gaskets 5a being interposed between said rings and flanges and between the latter and the base. Centrally within the reservoir 2, 3, said base is formed with an upstanding frusto-conical member 6, terminating in the upper portion of said reservoir, and forming a support for pipe coils 7, which serve as the expansion chamber of a circulatory refrigeration system. Said coils conform to the frusto-conical form of the support 6, substantially covering the latter. Said refrigeration system further comprises a suitable compressor 8, driven by a motor 9, and adapted to deliver a refrigerant to the coils 7 through a duct 10. Connected into said duct are the usual condenser 11, storage tank 12, and expansion valve 13. The return duct from said coils to the compressor is indicated at 14. In extending from the coils 7 through the member 6, the ducts 10 and 14 are tightly sealed in said member.

The reservoir 2, 3, is preferably of glass or other suitable transparent material, being thus adapted to display as well as hold a beverage. To render such display more attractive, and to aerate the beverage, it is preferred to establish a circulation of the latter and a resultant jetting thereof against the reservoir top in a miniature fountain. Thus, a centrifugal pump 15 carried by the base 5 therebeneath has its intake connected through a pipe 16 to an inverted T-fitting 17 depending from said base and opening through the latter into the bowl 2. Said pump discharges through a pipe 18, bent to extend centrally upward through the member 6, and opening in the top of said member. Said pump is driven through a belt 19 or the like from an electric motor 20.

The purpose of employing spaced bowls 2 and 3 to form the beverage reservoir, and of air-sealing said bowls to the base 5 is to permit maintenance of an approximate vacuum in the space 21 between said bowls, for heat insulation purposes. Since any construction capable of maintaining an initially established vacuum over a considerable time period would involve unduly expensive manufacturing processes, it is preferred to provide for intermittently renewing such vacuum.

Thus, there is mounted at some suitable point in the cabinet 1 a vacuum pump 22, driven through a belt 23 or the like from said motor 20. A suction line 24 leading from said pump, opens through the base 1 into the insulating space 21, and said pump may exhaust to the atmosphere in any suitable manner (not shown).

A feature of the invention is utilization of the pump 22 to evacuate the bowl 2, during refilling thereof, to effect a rise of the replenishing beverage in said bowl, under atmospheric pressure. Thus the base 1 is marginally formed with a cup 25 having in its bottom an outlet, discharging into a duct 26 which in turn discharges into the casing of the pump 15. Within said duct, a valve 27 is upwardly seated by a spring 28 to normally close said port. Pivoted upon said cup, at its mouth is a substantially D-shaped control element 29 of more or less annular form, substantially conforming to the rim of the cup and normally slightly raised above said rim by a spring 30. When the spout of a pouring vessel, as is indicated in dash lines at 32, (see Fig. 2) is rested upon the control element 29, to discharge into the cup 25, said element yields downwardly, as indicated in dash lines in Fig. 2. This effects an upward rocking of an arm 33 fast upon the pivot pin 31 and having its free end connected through a swinging link 34 and bell crank 34a to a piston valve 35 operating in a cylinder 36 horizontally formed upon the head of the vacuum pump 22. Said cylinder is open at one end to accommodate the link 34 and its other end is closed and ported for connection to the suction line 24. The main cylinder of said pump is connected to the cylinder 36 adjacent to the closed end of the latter through a suction port 37. The mid portion of the cylinder 36 has a port 38 with which connects a suction line 39, rising within the coil-supporting member 6, passing through the top thereof and opening in the top portion of the bowl 2. When the element 29 occupies its normal slightly raised position, the valve 35 lies between the ports 37 and 38, so that the pump is effective to act only through the line 24 to evacuate the space 21. When the pouring vessel 32 is positioned to depress the control element 29, resultant rocking of the arm 33 shifts the valve 35 past the port 38, rendering the pump additionally effective upon the line 39 to evacuate the bowl 2. Under such conditions, the lines 24 and 39 are in communication through the cylinder 36, and evacuation of the bowl 2 is expedited by the flow of air therefrom into the space 21, incident to equalization of pressures in said bowl and space.

For dispensing a beverage from the reservoir 2, 3, a faucet 40 is connected to the fitting 17 and exteriorly projects from the cabinet 1. The valve 41 of said faucet is normally seated by a spring 41a and is carried by a stem 42 projecting forwardly of the faucet and having its front end connected by links 43, arranged at each side of the faucet to a pair of arms 44 terminally pivoted above the faucet, as indicated at 46 and pivoted at their lower extremities to a head on the front end of a plunger 46a, slidable in a bearing 47 in the front wall of the cabinet. Interiorly of the cabinet a second plunger 48 is aligned with the plunger 46, and normally freely engages the latter under pressure of a coiled spring 49. Pivotally (or otherwise) connected to the rear end of the plunger 48, within the cabinet, is a rack bar 50, resting on and meshing with a gear 51, arranged to drive a clock-work gear train 52.

In positioning a glass or other container beneath the faucet outlet, as appears in Fig. 6, the plunger 46a is rearwardly shifted by said glass and acts through the arms 44 and links 43 to unseat the faucet valve. The plunger 48 is actuated by and correspondingly with the plunger 46a, overcoming the spring 49. The rack bar 50, being inwardly actuated with the plunger 48, drives the gear train 52 as indicated by the arrows in Fig. 7. Upon release of the valve 41, it is immediately reseated by its spring 41a, the plunger 46 being at the same time returned to its normal outward position. The plunger 48, however, is retarded in its return travel by the clockwork 52, which is in turn retarded by any suitable governor, as for example the weighted vibrator arm 53. The preferred arrangement is such that several minutes will be occupied by return travel of the plunger 48. The latter is connected to the actuating arm 54 of a three-point toggle switch 55, controlling the latter as hereinafter more fully explained.

Within the bowl 2 and preferably within the hollow member 6, adjacent to the wall thereof, is a control chamber 56 for a switch-operating fluid system. Said chamber is connected to one end of a duct 57, opening at its other end into a normally contracted expansible chamber 58 carrying a bridging member 59 of a switch, which member through a predetermined expansion of said chamber is adapted to bridge the gap between the switch contacts 60. Some liquid of suitably low boiling point fills the system 56, 57, 58, and upon a predetermined rise of temperature in the bowl 2, said liquid becomes sufficiently gasified within the chamber 56 to cause a switch-closing expansion of the chamber 58. While such a temperature responsive, fluid-operable switch control system is common in mechanical refrigeration, the location of the control chamber 56 is unique.

Describing now the electrical connections to the motors 9 and 20 and to their control switches, 61 and 61a designates a pair of current supply mains, adapted to energize the motor 9 through conductors 62 and 63, the latter being interrupted by the switch 59, 60. The conductor 62 together with an extension 64 thereof forms a lead from the main 61a to the motor 20, the other lead 65 to said motor extending from a terminal 66 of the switch 55. Said terminal pivotally mounts a switch arm 67 which normally engages a contact 68 and may alternatively engage a contact 69. The contact 68 has a connection to the main 61 interrupted by the switch 59, 60, said connection being established by a conductor 70 leading to the conductor 63. The contact 69 is connected to the main 61 independently of the switch 59, 60, through a conductor 71. A coiled spring 72 which is adapted to effect a snap travel of the arm 67 between its two positions extends from said arm to a finger 73 upon the pivotal upper end of the control element 54 of the switch 55.

In the operation of the described apparatus, the beverage stored in the reservoir 2, 3 is refrigerated by an intermittently established circulation of a refrigerant through the coils 7. The compressor 8 effects such circulation, the circulatory system comprising the duct 10, condenser 11, tank 12, expansion valve 13 and return duct 14, as will be readily understood by those familiar with this art. The refrigerating system will be automatically set into operation, when required, by a temperature rise in the beverage reservoir, this being accomplished by automatic closing of the switch 59, 60 through the fluid control comprising the chamber 56, duct 57, and expansible chamber 58.

Closing of the switch 59, 60 will energize both motors 9 and 20, the former through the conductors 62 and 63, and the latter through the conductors 62, 64, 65, 70 and the switch 55. The latter in its normal position, shown in Fig. 1, connects the conductors 65 and 70 through the terminal 66, arm 67 and contact 68. Thus during those periods when refrigerant circulation is maintained, the pump 15 will be driven and the beverage circulated, jetting up from the pipe 18 against the top of bowl 2 in an attractive display. Also the vacuum pump 22 will operate during such periods, renewing evacuation of the space 21.

Whenever a glass of the beverage is served from the faucet 40, unseating of the faucet valve will be effective through the links 43, arms 44, and plungers 46a and 48 to shift the switch arm 67 to its position connecting the terminal 66 and contact 69, whereby the motor 20 will be energized independently of the switch 59, 60. On release of the faucet valve, the plunger 46a will be immediately returned to its normal forward position. The plunger 48, however, will be retarded in its return travel by the action of the escapement 53 on the clock work 52. Thus the motor 20 will continue to run, for a predetermined period after a portion of the beverage has been drawn off, maintaining a display circulation of the beverage and renewing evacuation of the space 21.

As the plunger 48 finally regains its normal forward position, the switch arm 61 will be snapped back into its normal engagement with the contact 68, breaking the circuit of the motor 20, but leaving such circuit in condition to be closed by the switch 59, 60.

In its nomal position, the piston valve 35 leaves the port 38 open to the atmosphere and hence allows air to enter the top of the bowl 2 by way of the duct 39 to replace the beverage as the latter is dispensed.

When the reservoir 2, 3 is being refilled, the refilling vessel 32, resting upon the control element 29, depresses the latter, and acts through arm 33, rod 34 and bell crank 34a to shift the valve 35 so as to place the ports 37 and 38 in communication with each other and with the suction line 24. Immediately air rushes from the bowl 2 into the space 21 until an equalization of pressures is effected, the resultant pressure drop in the bowl 2 causing the valve 27 to unseat and drawing the replenishing supply of beverage up into the bowl through the pipe 18. Preliminary to refilling, the circuit of the motor 20 is automatically closed through a switch 74, which, as illustrated, is connected to the bell crank 34a, and thus a drive to the vacuum pump 22 is maintained during refilling to further reduce pressure in the bowl 2 and space 21 so far as is necessary to refill said bowl to the desired level. Removal of the refilling vessel 32 from its pouring position allows the element 29 to rise whereby the piston valve again disconnects the suction line 39 from the vacuum pump and opens the switch 74, reestablishing normal conditions.

It is a feature of the described construction that the display reservoir 2, 3 forms the only required storage vessel for the beverage, thus reducing cost and complexity.

Production of an approximate vacuum surrounding the stored beverage minimizes heat transfer into the reservoir, and consequently permits maintenance of a desired low temperature of the beverage with a minimum of refrigerant energy.

While it will be apparent that the illustrated embodiment of my invention is well calculated to adequately fulfill the objects and advantages primarily stated, it is to be understood that the invention is susceptible to variation, modification and change within the spirit and scope of the subjoined claims.

What I claim is:

1. A beverage dispenser comprising a beverage receiver, means for introducing a beverage into said receiver, means for regulably withdrawing the beverage from said receiver, means for maintaining an approximate vacuum around said receiver, a valve regulating withdrawal of the beverage, and means for effecting a renewal of said vacuum responsive to opening of said valve.

2. A beverage dispenser comprising an air sealed inner receiver and an outer receiver, a base mounting said receivers, means establishing a substantial air seal between said receivers and base, means carried by said base forming a bottom for the inner receiver, means extending upwardly through said bottom for introducing a liquid into the inner receiver when evacuated, means for regulably withdrawing such liquid from the inner receiver, vacuum inducing means, a suction line connecting said means with the space between said receivers, a suction line extending from said means and opening in the upper portion of the inner receiver, and a valve, controlling connection of the last named suction line with said vacuum-inducing means.

3. A beverage dispenser comprising an air sealed beverage receiver, means for introducing a beverage into said receiver under atmospheric pressure comprising an inlet cup, means for regulably withdrawing the beverage from said receiver, vacuum inducing means, a suction line connected to said means and opening in the top portion of said receiver, a valve controlling communication of said suction line and vacuum inducing means, a control element associated with said inlet cup and movable under pressure of a pouring vessel applied to said cup, and an actuating connection from said control element to said valve.

4. A beverage dispenser comprising an air sealed inner receiver and an outer receiver, means connecting said receivers and forming a vacuum chamber therebetween, means for introducing a beverage to the inner receiver comprising an inlet cup, means for regulably withdrawing the beverage from the inner receiver, vacuum inducing mean, suction lines leading from the vacuum inducing means and opening respectively into said vacuum chamber and into the upper portion of said inner receiver, a valve controlling communication of said suction lines with each other and with said vacuum inducing means, a control element associated with said inlet cup and movable under pressure of a pouring vessel applied to said cup, and an actuating connection from said control element to said valve.

5. A beverage dispenser comprising a beverage receiver, means for inducing a vacuum in said receiver to effect its refilling with beverage, a refilling connection having an outlet to said receiver, a drive motor for said vacuum-inducing means, and means for energizing said motor comprising a control element actuable by a pouring vessel in its approach to said refilling connection.

6. A beverage dispenser comprising a beverage receiver, having a transparent wall, a circulation system having an inlet thereto from the lower portion of said receiver and discharging in the upper portion of the receiver, means for inducing a vacuum in said receiver for refilling purposes, and a refilling connection opening into the receiver through said circulation system.

7. A beverage dispensing apparatus comprising a beverage receiver, a system of refrigerant circulation comprising a heat absorbing portion in said receiver, means for effecting a circulation of the contents of said receiver, and means for controlling both of said circulations by temperature variations in said receiver.

8. A beverage dispenser comprising an air sealed inner receiver and an outer receiver, means for establishing a substantial air seal between said receivers and producing a vacuum chamber therebetween, means for introducing a beverage to the inner receiver under atmospheric pressure, means for regulably withdrawing said beverage, vacuum-inducing means, and means for connecting said vacuum chamber and the inner receiver to said vacuum-inducing means, and for alternatively connecting said vacuum chamber to the vacuum-inducing means, independently of the inner receiver.

9. A beverage dispenser comprising a beverage receiver, means for delivering a beverage to said receiver, means for inducing an applying part associated with and responsive control mechanism for the last named means, including a control-applying part, movable responsive to use of said delivery means.

10. A beverage dispenser comprising a beverage receiver, means for delivering a beverage to said receiver, means for inducing an approximate vacuum in said receiver, a motor driving said vacuum-inducing means, and mechanism for energizing said motor and for connecting said vacuum-inducing means to said receiver, including a control applying parts associated with and responsive to use of said delivery means.

11. In a device of the character described, the combination with a base, an inverted beverage receiver mounted upon said base, a second receiver upon said base, enclosing and outwardly spaced from said beverage receiver, clamping rings embracing the lower ends of said receivers and clamping the receivers on said base, and means for regulably withdrawing a beverage from said beverage receiver.

12. A beverage dispenser, comprising a beverage receiver, a beverage delivery duct opening at one end into said receiver and having an inlet for the beverage at its other end, means for evacuating said receiver to induce a flow through said duct, a motor driving the last-named means, control mechanism for said motor comprising a control-applying element associated with the inlet of said duct, and means for regulably withdrawing the beverage from said receiver.

13. A beverage dispenser comprising a beverage receiver, a beverage delivery duct opening into said receiver at one end and having an inlet for the beverage at its other end, vacuum-inducing means, an evacuation line leading from said means to said receiver, whereby a delivery of beverage to the receiver may be induced through said duct by evacuation of the receiver, means for normally venting said receiver to the atmosphere, a valve controlling the last-named means, a drive motor for said vacuum-inducing means, and a common means for energizing said motor and for closing said valve.

14. In a beverage dispenser, a beverage receiver, a beverage circulating pump, a supply connection to said pump from the lower portion of said receiver, a discharge connection from said pump upwardly opening in the top portion of the receiver, vacuum-inducing means, an evacuation line leading from said means and opening in the top portion of said receiver, and a common drive means for said circulating pump and vacuum-inducing means.

In testimony whereof I sign this specification.

ISRAEL GARSON KONIKOW.